US008646751B2

(12) United States Patent
Valter

(10) Patent No.: US 8,646,751 B2
(45) Date of Patent: Feb. 11, 2014

(54) METAL SEAL FOR BALL VALVES AND BALL VALVE COMPRISING SAID SEAL

(75) Inventor: Riccardi Valter, Milan (IT)

(73) Assignee: Cesare Bonetti S.p.A., Garbagnate Milanese (IT)

(*) Notice: Subject to any disclaimer, the term of this patent is extended or adjusted under 35 U.S.C. 154(b) by 68 days.

(21) Appl. No.: 12/956,079

(22) Filed: Nov. 30, 2010

(65) Prior Publication Data

US 2011/0127457 A1 Jun. 2, 2011

(30) Foreign Application Priority Data

Dec. 1, 2009 (IT) ............................... MI2009A2115

(51) Int. Cl.
*F16K 25/00* (2006.01)
(52) U.S. Cl.
USPC ....... 251/180; 215/315.01; 215/314; 215/359
(58) Field of Classification Search
USPC ........... 251/314, 61.5, 174, 180, 309, 315.01, 251/160, 359; 277/207 R, 479, 480, 549, 277/460, 465, 402–403
See application file for complete search history.

(56) References Cited

U.S. PATENT DOCUMENTS

| 2,788,015 | A | * | 4/1957 | Scherer ................... 137/246.16 |
| 2,788,017 | A | * | 4/1957 | Scherer ................... 137/246.19 |
| 2,979,071 | A | * | 4/1961 | Herring et al. ........... 137/246.13 |
| 3,101,740 | A | * | 8/1963 | Ray ............................. 137/596 |
| 3,180,351 | A | * | 4/1965 | Wolfensperger ......... 137/246.18 |
| 3,306,315 | A | * | 2/1967 | Cook ....................... 137/246.22 |
| 3,584,641 | A | * | 6/1971 | Milleville et al. ........ 137/246.15 |
| 4,241,895 | A | * | 12/1980 | Sternenberg et al. .......... 251/173 |
| 4,421,895 | A |   | 12/1983 | Echte et al. |
| 4,557,461 | A | * | 12/1985 | Gomi et al. ..................... 251/172 |
| 4,778,148 | A | * | 10/1988 | Kruger ........................... 251/174 |
| 4,890,816 | A | * | 1/1990 | Nicholson ...................... 251/174 |
| 2008/0148731 | A1 | * | 6/2008 | Cao ............................. 60/641.2 |

FOREIGN PATENT DOCUMENTS

GB      2206952 A      1/1989

* cited by examiner

*Primary Examiner* — John K Fristoe, Jr.
*Assistant Examiner* — Marina Tietjen
(74) *Attorney, Agent, or Firm* — Mintz Levin Cohn Ferris Glovsky and Popeo, P.C.

(57) ABSTRACT

A metal seal for valves of the ball type, the metal seal including a rigid annular body including a thickness in the longitudinal direction, and an annular lip having a front surface for relative contact with a surface of the ball, wherein said front surface for making relative contact comprises inset radial grooves.

7 Claims, 3 Drawing Sheets

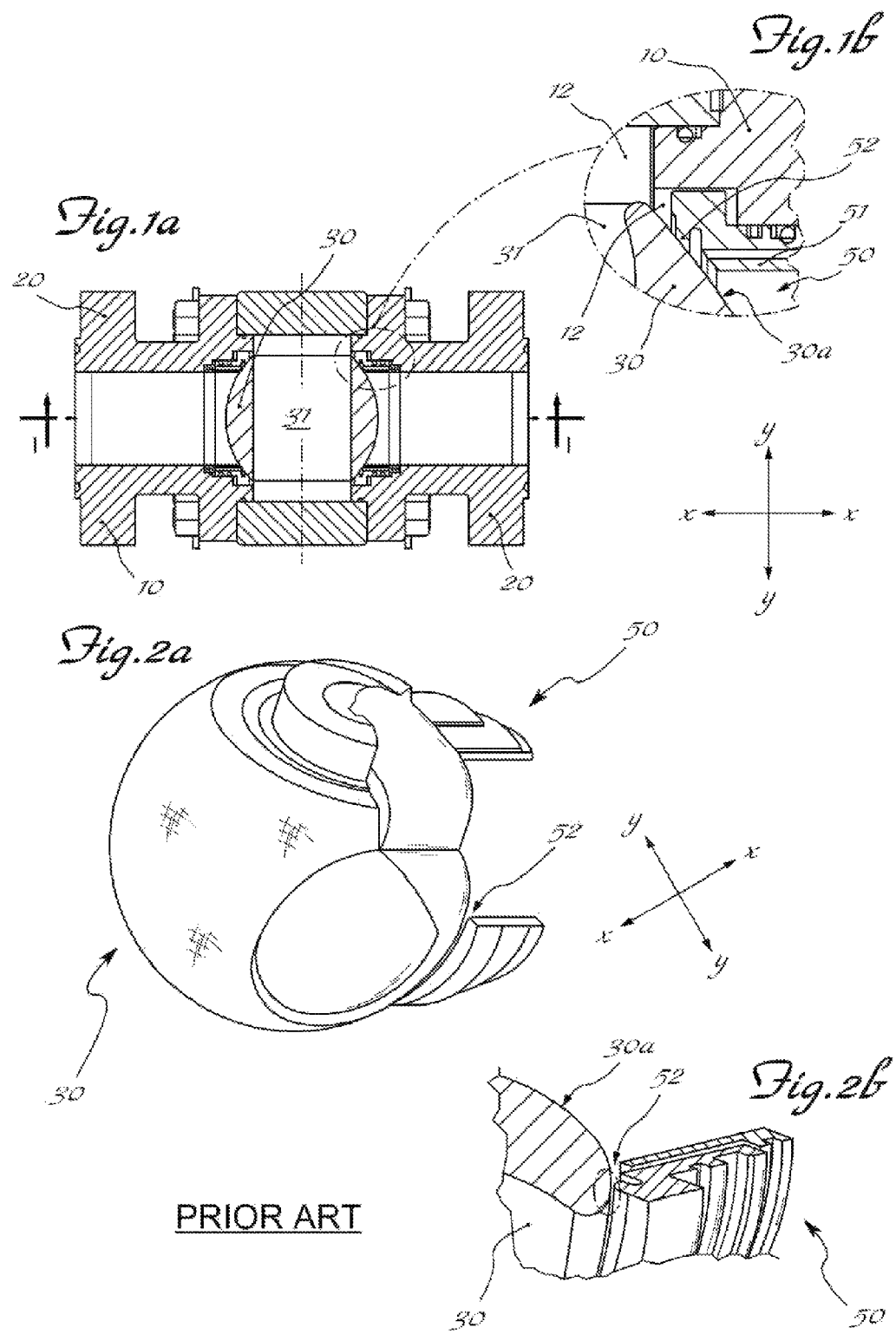
PRIOR ART

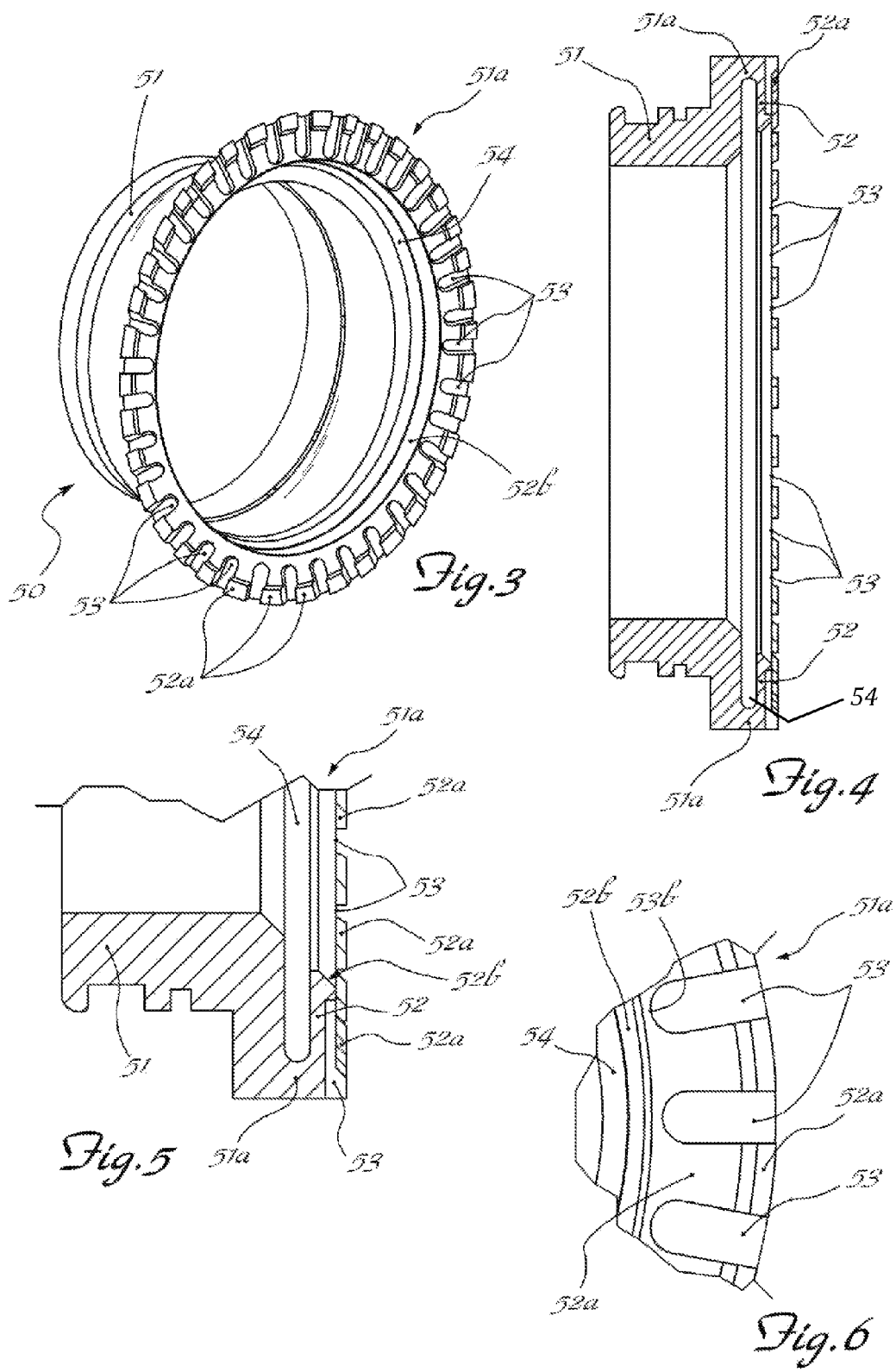

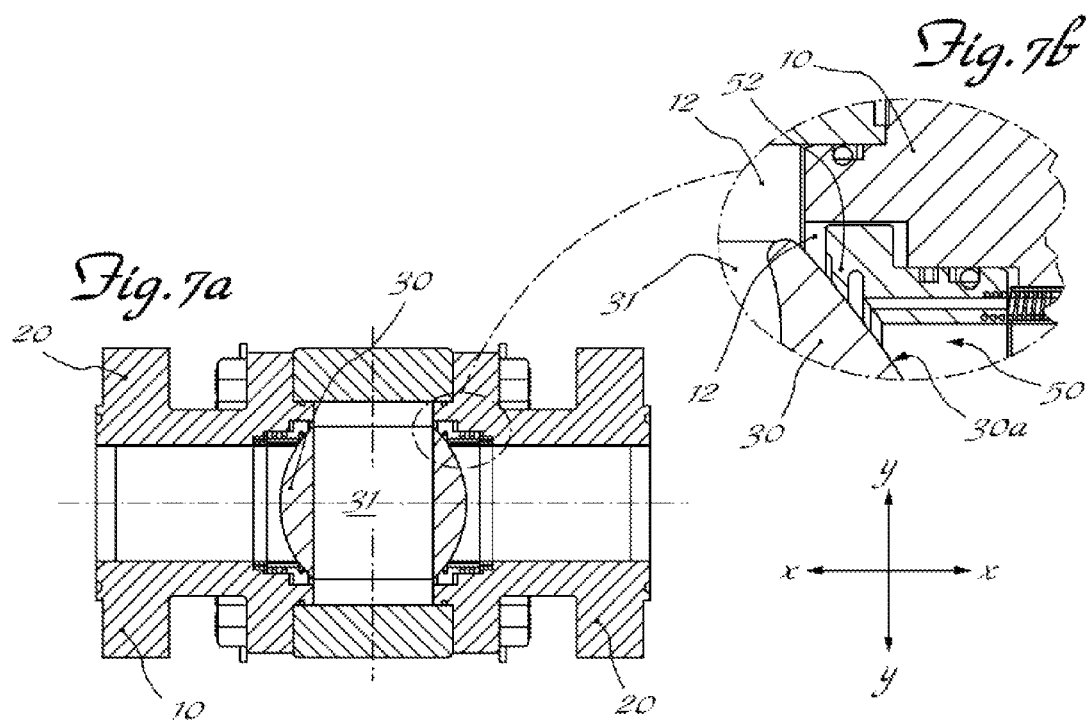
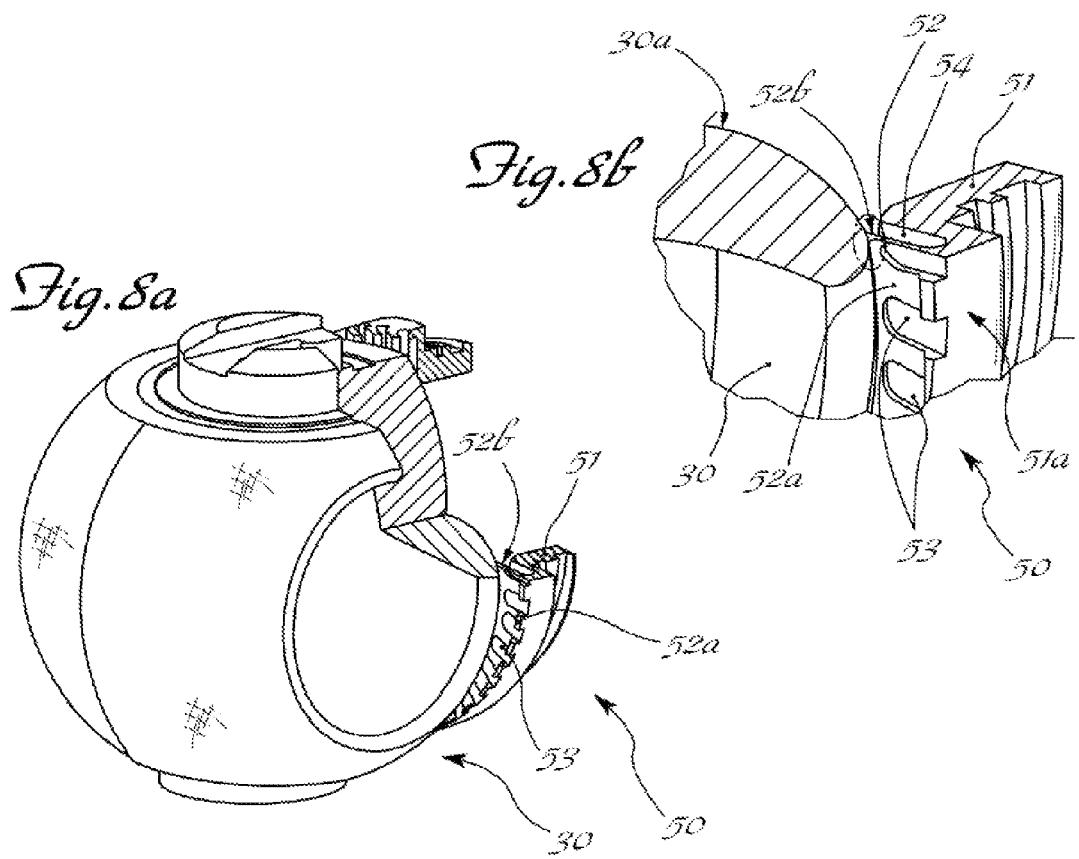

METAL SEAL FOR BALL VALVES AND BALL VALVE COMPRISING SAID SEAL

CROSS-REFERENCE TO RELATED ACTIONS

This application claims priority to Italian Patent Application No. MI2009A 002115, filed in Italy on Dec., 1, 2009, which is incorporated by reference herein in its entirety.

BACKGROUND

The present invention relates to a metal seal for ball valves and a ball valve comprising such a seal.

It is known in the technical sector relating to the conveying of fluids inside pipes that there exists the need to intercept said pipes using valves that are able to connect two pipe sections and allow/interrupt the flow of fluid through them.

Particularly important in this connection are ball valves, e.g., valves in which the through-flow/interruption in flow can be controlled by a ball which is seated inside the valve body and provided with a through-hole, having a diameter substantially the same as that of the pipes, and which can be rotationally operated between an open position, where the hole is coaxial with the direction of the flow, and a closed position where the hole is transverse to the direction of flow, and in which the seal between the ball and pipe is achieved by means of annular seals arranged between the respective opposite surfaces making relative contact.

In order to achieve sealing of the ball chamber, the valves typically have a ring which is coaxially arranged between the valve body and the ball against which the ring is axially pressed, via elastic means, so as to ensure contact between the sealing surface and the ball itself. Said sealing surface is normally composed of a metal surface of the ring itself which is varyingly made and/or treated or a suitably configured seal which is forced in an axial direction inside a special seat of the ring.

Although performing their function, these seals nevertheless have drawbacks which in practice limit their use particularly in high-temperature and/or high-pressure applications where the metal seals, although better suited, are very costly, both because of the need for a hardening treatment of the contact surfaces of ball and ring acting as seat, and because of the machining operations which are required to adapt and ensure a perfect fit between the contact surfaces of the ball and the two sealing rings.

In addition to the above and as shown in FIGS. 1 to 2b relating to the prior art, it happens also in practice that, during high-pressure applications, the ball and seal tend to be deformed as a result of the pressure exerted by the fluid and these deformations are irregular both in the region of the ball and in the region of the seal, which is no longer able to adapt perfectly to the outer surface of the ball, resulting in zones where there is no contact and therefore no sealing of the valve which leaks.

Examples of the prior art are described in GB 2,206,952 which describes a valve of the floating type, namely with a sealing action provided by the movement of the ball which is displaced against a fixed sealing ring. The sealing ring described consists of a thin elastic plate that flexes like a spring so as to adapt to the surface of the ball.

It follows that, if said surface is not uniform, the relative contact is not precise and leaks occur. Moreover, it is pointed out that the surface of the ring in contact with the ball is formed by a peripheral annular lip 4A and that the incisions 4C which allow deformation of the ring are formed on the surface opposite to the sealing surface.

A further example of the prior art is described in U.S. Pat. No. 4,421,895 in which a control disc rotates against a fixed sealing ring. In this case also the sealing ring is elastic and the sealing surface 30b which reacts against the corresponding surface 28 of the disc does not have milled zones which are instead formed on a rear surface making contact with a retaining ring 36.

SUMMARY

One capability of the present disclosure is that of providing a metal seal for ball valves of the type with sealed chamber formed between the ball and the valve body. The seal is preferably able to be used at very high and/or very low temperatures and/or at high operating pressures, thus ensuring sealing of the valve also in the presence of deformations of the shut-off valve.

In connection with this capability, it is also desired that this valve should be easy and inexpensive to produce and assemble and be able to be applied also to already existing and not specifically designed valves. These results can be achieved according to the present invention by a metal seal as recited in, for example, the claims.

In general, in an aspect, embodiments of the invention can provide a metal seal for valves of the ball type, the metal seal including a rigid annular body including a thickness in the longitudinal direction, and an annular lip having a front surface for relative contact with a surface of the ball, wherein said front surface for making relative contact comprises inset radial grooves.

Embodiments of the invention may provide one or more of the following features. The metal seal includes grooves are radially open on a larger-diameter side of the lip. The metal seal according includes radial grooves that are spaced from each other at regular angular intervals. The metal seal includes radial grooves that define a solid/void ratio of the contact surface of the lip ranging between about 10% and 70%. The metal seal includes radial grooves that are formed with length-to-width dimensional ratios greater than 1.

In general, in another aspect, embodiments of the invention can provide a ball valve including a valve body including a seat, a ball disposed in the seat and including a coaxial through-opening, the ball including an outer surface and configured to be rotationally operated from a closed position to an open position and vice versa, a coaxial metal seal arranged between the valve body and the ball and acting on the outer surface of the ball, said metal seal comprising a rigid annular body which has a thickness in the longitudinal direction and an annular lip with a front surface for relative contact with the surface of the ball, wherein the outer part of the annular lip, radially external of said front contact surface, has a plurality of inset radial grooves.

Embodiments of the invention may provide the following features. The ball is fixed and the seal is floating in the longitudinal direction.

These and other capabilities of the invention, along with the invention itself, will be more fully understood after a review of the following non-limiting figures, detailed description, and claims.

BRIEF DESCRIPTION OF THE FIGURES

FIG. 1a shows a cross-section along a longitudinal vertical plane of a known ball valve in the closed position;

FIG. 1b shows a detail, on a larger scale, of the seal shown in FIG. 1a with deformed ball;

FIG. 2a shows a perspective view of the ball with ring according to FIG. 1 in the deformed condition;

FIG. 2b shows a detail, on a larger scale, of the zone where there is no contact between ball and ring according to FIG. 2a;

FIG. 3 shows a perspective view of the contact side of the sealing ring according to the present invention;

FIG. 4 shows a cross-section along a diametral plane of the ring according to FIG. 3;

FIG. 5 shows a partial detailed cross-section of the outer annular edge of the ring according to FIG. 2;

FIG. 6 shows a partial view, on a larger scale, of the detail of the radial grooves on the ring according to FIG. 2;

FIG. 7a shows a cross-section along a longitudinal vertical plane of a ball valve according to the present invention in the closed position;

FIG. 7b shows a detail, on a larger scale, of the seal according to FIG. 7a with deformed ball;

FIG. 8a shows a perspective view of the ball with ring according to the present invention in the deformed condition; and FIG. 8b shows a detail, on a larger scale, of the zone of contact between ball and ring according to the present invention.

DETAILED DESCRIPTION

As shown in FIG. 1, and assuming solely for the sake of convenience of the description and without any limitation of meaning, a pair of reference axes in a longitudinal direction X-X, parallel to the direction of flow, and transverse direction Y-Y, the ball valve according to the present invention, shown by way of example in the drawings in the form of a three-part valve of the trunnion type, essentially comprises a valve body 10 provided with a seat housing, a ball 30 having a coaxial cylindrical opening 31 and able to be rotationally operated from a valve closing position (FIG. 1) into a valve opening position (not shown) by conventional means (not shown). The valve also comprises two opposite end flanges 20 which are fastened to the valve body 10 on opposite sides of the ball and are designed to provide a connection to the pipe (not shown).

A metal axial seal 50 is arranged between each flange 20 and the ball 30 so as to interfere with the outer surface 30a of the ball 30 against which it forms a seal, thus creating the ball chamber 12.

As illustrated in FIGS. 1a-2b relating to the prior art a sealing valve 50 of the conventional type is unable to maintain the sealing action owing to the irregular deformations of the ball 30 which cause a loss of relative contact between the seal 50 and the ball 30 itself, since the former is unable to adapt to the said deformations.

As shown in FIGS. 3-6, an embodiment of the present invention envisages a metal axial seal 50 formed by a ring 51, which has a large thickness in the longitudinal direction X-X and is rigid and the edge 51a of which for performing sealing against the ball comprises:

an annular lip 52, the annular front surface 52b of which, making the sealing contact with the ball 30, is slanted towards the inside of the ring along the longitudinal direction X-X;

the radially outer part 52a of the annular lip 52 has a plurality of inset radial grooves 53 extending in the radial direction;

axially behind the annular lip 52 there is provided an annular groove 54 for giving a uniform elasticity to the sealing annular lip 52 itself.

According to preferred embodiments it is envisaged that said radial grooves 53:

are spaced from each other at regular angular intervals;

extend radially on the outer part 52a of the annular ring 52, and are blind toward the slanted front annular sealing surface 52b;

define a solid/void ratio of the lip 52 ranging between 10% and 70%;

are formed with length-to-width dimensional ratios greater than 1.

As shown in FIGS. 7a-8b a valve 10 equipped with a seal according to the present invention is preferably able to operate without leakages even at high working pressures and very high and/or very low temperatures at which conventional seals do not operate correctly, giving rise to leakages, while the seal according to the invention, provided with grooves 53 on the outer part 52a of the annular lip 52, is able to follow the irregular deformations of the ball 30, thus maintaining perfect relative contact between the respective surfaces.

It is therefore clear how, with the valve according to an embodiment of the invention, it is possible to obtain a sealed chamber and axial sealing surfaces which are particularly suitable for use at very high and/or very low temperatures and/or high pressures, with fluids which may also be abrasive, and which are also applicable to large-diameter valves. This is due, at least in part, to the fact that the particular configuration of the sealing lip with radial inset grooves ensures that the lips itself is elastically yielding both in the radial direction and relative to the plane of contact between ring and ball, allowing the former to adapt elastically to the irregular deformations of the latter, resulting in a long operating life with a complete, if not perfect sealing action which is referred to in the sector as "bubble tight."

The seal can, moreover, be easily replaced without having to perform operations which damage the various parts, allowing easy and rapid maintenance of the valve in the event of wear of the seal which may be changed without having to replace both the seals and the ball. In addition, the replacement of the seal does not require the use of special technology and may therefore be performed also at the premises of the end user, without having to send the valve to the manufacturer.

Other embodiments are within the scope and spirit of the invention. Features implementing functions may also be physically located at various positions, including being distributed such that portions of functions are implemented at different physical locations.

Further, while the description above refers to the invention, the description may include more than one invention.

What is claimed is:

1. A metal seal for valves of the ball type, the metal seal comprising:

a rigid annular body including a thickness in the longitudinal direction; and an annular lip having a slanted front surface (52b) for relative sealing contact with a surface of a ball, a radially outer part (52), and an annular groove (54) being provided axially behind the annular lip (52);

wherein the radially outer part (52a) of the annular lip (52) comprises inset radial grooves (53) that extend radially on the radially outer part (52a), the inset radial grooves (53) being blind toward the slanted front surface (52b) for relative sealing contact with a surface of the ball, the annular groove (54) positioned behind the radially outer part (52a) such that the annular lip (52) elastically yields in the radial direction and elastically yields in a direction relative to a plane of contact between the annular lip (52) and the ball thereby elastically adapting to irregular deformations of the ball.

2. The metal seal according to claim 1, wherein said grooves are radially open on a larger-diameter side of the radially outer part (52a) of the annular lip.

3. The metal seal according to claim 1, wherein said radial grooves are spaced from each other at regular angular intervals.

4. The metal seal according to claim 1, wherein said radial grooves define a solid/void ratio of the contact surface of the lip ranging between about 10% and 70%.

5. The metal seal according to claim 1, wherein said radial grooves are formed with length-to-width dimensional ratios greater than 1.

6. A ball valve comprising:

a valve body including a seat;

a ball disposed in the seat and including a coaxial through-opening, the ball including an outer surface and configured to be rotationally operated from a closed position to an open position and vice versa;

a coaxial metal seal arranged between the valve body and the ball and acting on the outer surface of the ball, said metal seal comprising a rigid annular body which has a thickness in the longitudinal direction, an annular lip having a slanted front surface (52b) for relative sealing contact with a surface of the ball, a radially outer part (52a), and an annular groove (54) being provided axially behind the annular lip (52);

wherein the radially outer part (52a) of the annular lip (52) comprises inset radial grooves (53) that extend radially on the radially outer part (52a), the inset radial grooves (53) being blind toward the slanted front surface (52b) for relative sealing contact with a surface of the ball, the annular groove (54) positioned behind the radially outer part (52a) such that the annular lip (52) elastically yields in the radial direction and elastically yields in a direction relative to a plane of contact between the annular lip (52) and the ball thereby elastically adapting to irregular deformations of the ball.

7. The valve according to claim 6, wherein the ball is fixed and the seal is floating in the longitudinal direction.

* * * * *